INVENTORS
HANSPETER SCHNEGG
HEINRICH GRIMM

BY Craig & Antonelli

ATTORNEYS

United States Patent Office 3,548,670
Patented Dec. 22, 1970

3,548,670
V-BELT PULLEY
Hanspeter Schnegg, Korntal Kreis Leonberg, and Heinrich Grimm, Raidwangen Kreis Nurtingen, Germany, assignors to Ernst Heinkel Aktiengesellschaft, Stutgart-Zuffenhausen, Germany
Filed Sept. 11, 1968, Ser. No. 759,036
Claims priority, application Germany, Sept. 22, 1967,
H 60,280
Int. Cl. F16h 55/52
U.S. Cl. 74—230.17                         2 Claims

ABSTRACT OF THE DISCLOSURE

A V-belt pulley, in particular for a steplessly adjustable V-belt transmission, in which the inner conical section of the pulley forms a more acute cone angle than the outer conical section.

---

Figure 1:
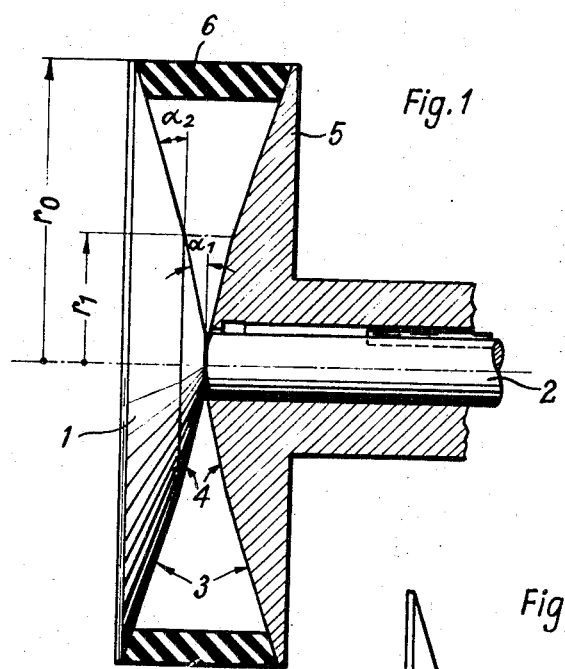

The present invention relates to a V-belt pulley, especially for steplessly adjustable V-belt change-speed transmissions with pair-wise fixed and axially displaceable V-belt pulleys.

Such V-belt transmissions are known per se in the prior art. The stepless adjustment of the transmission ratio takes place in that one of the axially displaceable V-belt pulleys is displaced whereby the position of the V-belt changes correspondingly and brings about a displacement of the second axially displaceable V-belt pulley.

The V-belt pulleys known heretofore were constructed as flat cones with one and the same cone angle. Directly adjacent the drive shaft the known V-belt pulleys were provided with an edge. The conical form passed over thereat into the cross-sectional surface or plane of a truncated cone whose diameter was larger by a few millimeters than the shaft diameter. This form was constructively conditioned and necessitated by the V-belt width, the groove angle of the pulley, the shaft diameter and a minimum gap for the compensation of the width tolerances of the V-belt.

With the V-belt pulleys known heretofore the cone angle, i.e., the so-called groove angle was smaller with smaller pulleys and correspondingly larger with larger pulleys. This was done because the abutment of the V-belt is different with large circumferential velocities than with smaller ones; the V-belt whose cross section possesses a trapezoidal shape matched to the groove angle, changes this form by reason of its elasticity depending on the pressure bearing on the same and the stress in the plastic material connected therewith.

The adjusting range of a V-belt transmission is determined by the V-belt width and the cone angle of the V-belt pulley. Depending on the shaft diameter and the diameter of the lower V-belt part—with the known constructions of the cylindrical part—a more or less large annular surface results as part of the conically truncated surface. The adjusting range would become correspondingly larger by a larger stroke of the V-belt pulley. The V-belt flanks then reach the area of the edge of the truncated cone which would lead to an increased belt wear.

Based on these recognitions, the present invention aims at increasing the output range of an adjusting pulley with a predetermined V-belt width by increasing the adjusting range, insofar as the shaft diameter permits the same, and more particularly without increasing the belt wear.

The present invention aims at creating a V-belt pulley which has such a shape that the abutment of the V-belt flanks at the V-belt pulley is equally optimum over the entire width thereof and is not subjected to a special wear in a narrow working position.

In order to achieve this goal of the present invention, the inner cone portion of the V-belt pulley is provided according to the present invention with a more flat cone angle than the outer cone portion. In one preferred embodiment of the present invention, the radius of the base surface of the entire V-belt pulley is between two and three times as large as the radius of the base surface of the inner cone portion.

Figure 2:
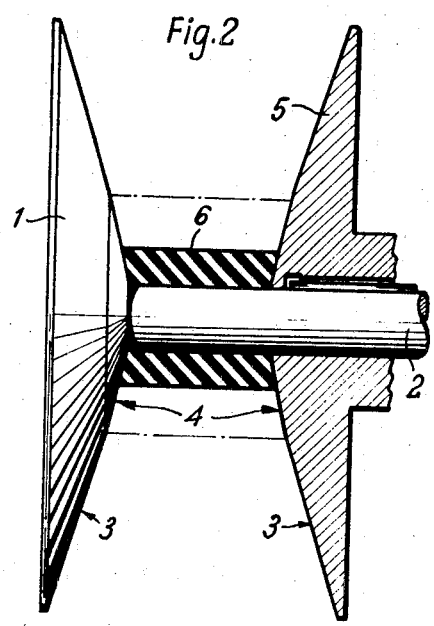

These and further objects, features, and advantages of the present invention will become more obvious from the following description when taken in connection with the accompanying drawing which shows, for purposes of illustration only, one embodiment in accordance with the present invention, and wherein:

FIG. 1 is a schematic side view, partly in cross section, of a V-belt pulley arrangement in accordance with the present invention, schematically illustrating in side view a V-belt pulley non-rotatably connected with the V-belt shaft but axially displaceable in relation thereto with the V-belt in its radially outermost position; and FIG. 2 is a schematic side view, partly in cross section, similar to FIG. 1 with the V-belt at its radially innermost position.

Referring now to the drawing, the V-belt pulley section 1 is securely arranged in any conventional manner on the shaft 2 and is provided with two cone surfaces 3 and 4 having different cone angles $\alpha_1$ and $\alpha_2$, respectively. The radius of the base surface of the cone 4 is designated by $r_1$ while the radius of the entire V-belt pulley is designated by $r_0$. The V-belt pulley section 5 is arranged on the shaft 2 so as to be axially displaceable but non-rotatable with respect thereto by any conventional, known means.

A V-belt 6 rests against the two cone surfaces 3. For reasons of clarity of the drawing, the difference between the angles $\alpha_1$ and $\alpha_2$ is illustrated strongly exaggerated. The actual difference between these angles would be on the order of 7–10%, with $\alpha_1$ being smaller than $\alpha_2$.

Whereas the V-belt 6 abuts with a large circumferential velocity and with a correspondingly smaller specific abutment pressure against the cone surface 3, it will run at the inner cone surface 4 under higher pressure and corresponding larger stress. The plastic belt material thereby deforms correspondingly so that the optimum abutment is assured completely down to the shaft 2. The wear with the use of larger transmission ratios, which was feared heretofore, is thus avoided by the present invention.

While we have shown and described only one embodiment in accordance with the present invention, it is understood that the same is not limited thereto but is susceptible of numerous changes and modifications as known to a person skilled in the art, and we therefore do not wish to be limited to the details shown and described herein, but intend to cover all such changes and modifications as are within the scope of such persons skilled in the art.

We claim:

1. A V-belt pulley combination for steplessly-adjustable V-belt transmissions, wherein said V-belt pulley comprises two pulley sections each having an inner and outer conical portion, each of said inner conical portions having a more acute cone base angle than the respective outer conical portion, the radius of the base of an outer conical portion being between about two to three times as large as the radius of the base surface of the respective inner conical portion, and wherein the inclined portions of said V-belt contacting said pulley contact said pulley over the entire surface of said inclined portions whether said V-belt contacts said pulley in said inner conical portion or said outer conical portion.

2. A V-belt pulley according to claim 1, wherein the cone base agle of an outer portion is larger than the cone base angle of the respective inner portion by an amount of about 7% to 10%.

References Cited

FOREIGN PATENTS

| 346,827 | 12/1904 | France | 74—230.17 |
| 574,631 | 3/1958 | Italy | 74—230.17 |
| 1,130,525 | 10/1956 | France | 74—230.17 |

JAMES A. WONG, Primary Examiner